Aug. 2, 1949.  F. E. WEICK  2,478,033
AIRPLANE CONTROL SYSTEM
Filed June 15, 1945  2 Sheets-Sheet 1
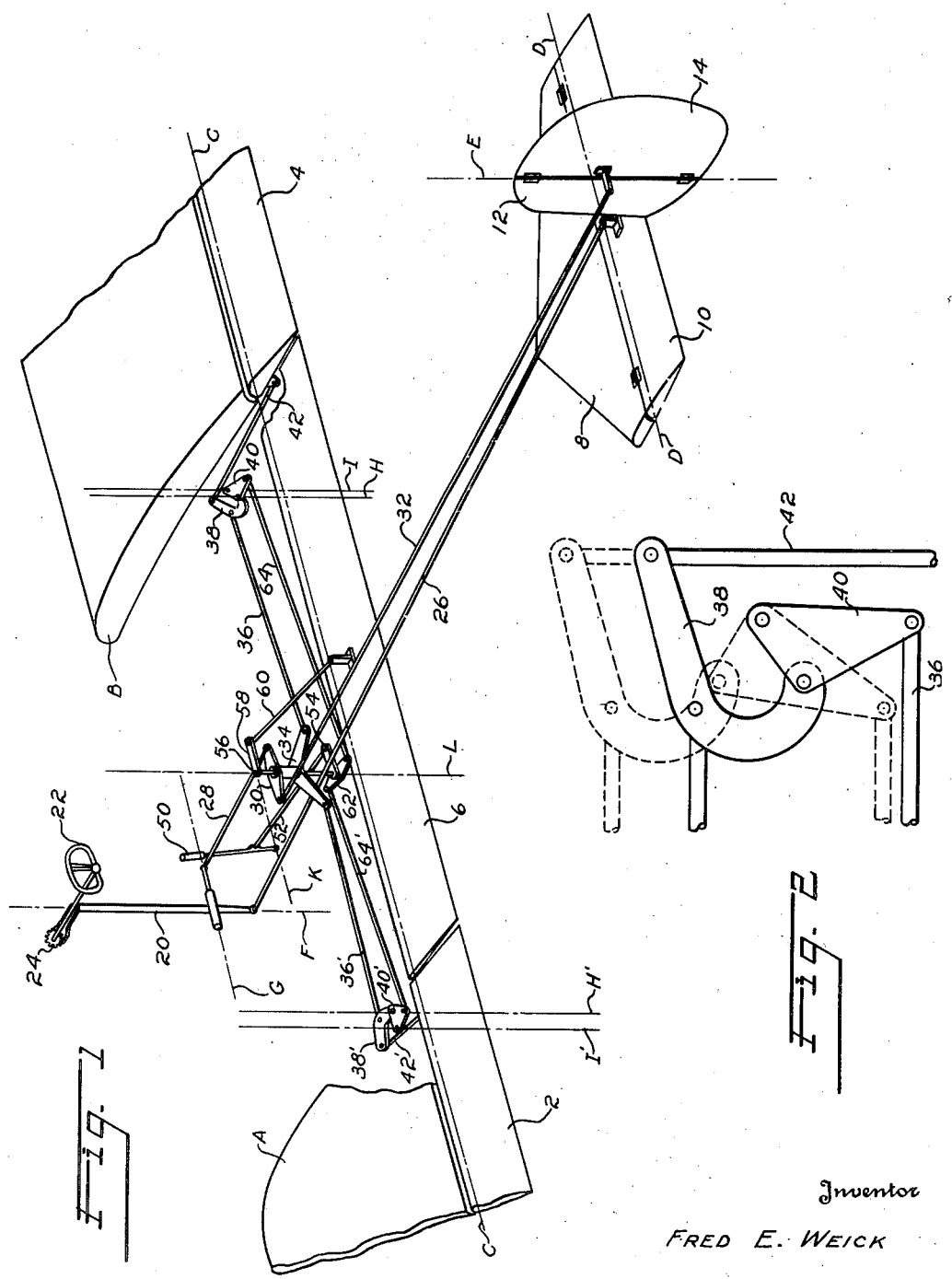
Inventor
FRED E. WEICK
By Scrivener & Parker
Attorneys Aug. 2, 1949.	F. E. WEICK	2,478,033
AIRPLANE CONTROL SYSTEM
Filed June 15, 1945	2 Sheets-Sheet 2
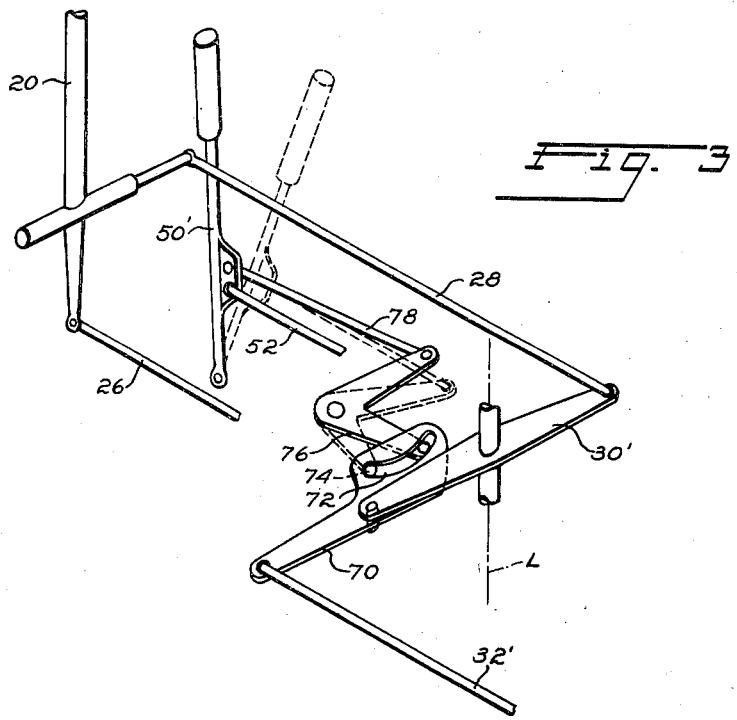
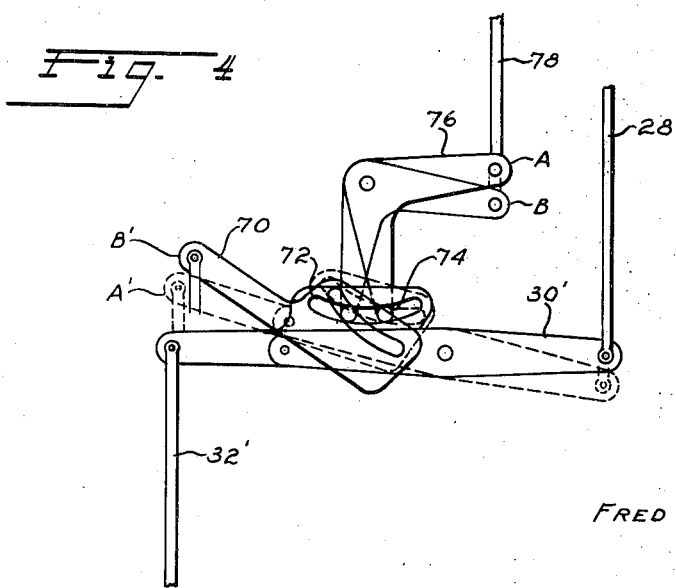
Inventor
FRED E. WEICK
By Scrivener & Parker
Attorneys Patented Aug. 2, 1949

2,478,033

UNITED STATES PATENT OFFICE 2,478,033

AIRPLANE CONTROL SYSTEM

Fred E. Weick, College Park, Md., assignor to Engineering and Research Corporation, Riverdale, Md., a corporation of Maryland Application June 15, 1945, Serial No. 599,550

3 Claims. (Cl. 244—83)

This invention relates to aircraft of the stable, two-control type such as are described and claimed in my earlier Patent No. 2,110,516, and is particularly intended to provide a control system for such aircraft in which lateral control and high lift effects may be achieved by the same control devices.

In the system of aircraft control known as the two-control system, an operating member, such as a wheel, is moved fore and aft to operate the pitch-varying means, such as the elevators, for longitudinal control, and is moved laterally, or turned if the operating member is a wheel, to deflect the ailerons, with simultaneous rudder deflection, in order to change the direction of flight. In certain two-control systems the transverse movement of the operating member or turning movement of the wheel moves the ailerons and rudder together, the rudder movement being approximately sufficient to overcome the adverse yawing moments due to the opposite deflection of the ailerons and thus produce satisfactory turning flight.

It is very desirable in all aircraft to provide some means to increase the lift during take-off and landing. One known device for producing this result is a horizontal trailing edge flap which is lowered when a high-lift effect is desired. It is desirable that such high-lift flaps extend throughout all, or a great part, of the wing span in order to give a great high-lift effect with a minimum of drag but it is very difficult to provide flaps of such extent because ailerons are usually provided at the outer ends of the trailing edge portions of the wings. It has therefore been proposed to operate the ailerons as high-lift flaps during take-off and landing. However, such arrangements have not been satisfactory for certain reasons which will now be explained. The ailerons, when operated as such, produce adverse yawing moments which are normally overcome by the use of a proper amount of rudder by the pilot. In systems in which the ailerons may also be operated as flaps, the operation as ailerons may be started from a normal position within the wing camber or from a drooped position in which a high-lift effect has been produced. The yawing moments produced by differential operation as ailerons is much greater when the ailerons are operated differentially from a drooped position than when they are operated from a normal position, and may be so great that if deflected alone and without rudder assistance they may at low speeds actually cause a reversal of roll from that intended. For these reasons, and others known to those skilled in the art, combination aileron high-lift flap devices have never been successful.

It is therefore the principal object of this invention to provide an operationally satisfactory and successful aircraft control system in which the trailing edge flaps may be operated differentially as ailerons or drooped simultaneously as high-lift flaps and in which the rudder is operated upon any differential operation of the flaps as ailerons, in order to oppose the adverse yawing moments produced by the aileron operation, regardless of whether the aileron operation begins from the up or normal position or from the drooped position, and in which the deflection of the rudder in opposing adverse yawing moments created by aileron operation varies in accordance with the operating condition of the trailing edge flaps before being operated as ailerons, being greatest if the flaps begin the differential operation as ailerons from a position of maximum downward deflection as high-lift flaps.

Other objects and features of novelty of the invention will be made apparent by the following description and the annexed drawings which, it will be understood, are only illustrative of the invention and impose no limitation thereon not imposed by the appended claims.

Referring to the draings, in which similar reference characters and numerals refer to the same, or similar, parts, Fig. 1 is a schematic, perspective illustration of an airplane control system according to the invention;

Fig. 2 is an enlarged view of parts shown in Fig. 1, illustrating certain movement thereof;

Fig. 3 is an enlarged perspective view of a modified form of parts of the control system of Fig. 1; and Fig. 4 is a view showing the operative movement of certain parts shown in Fig. 3.

An aircraft control system according to my invention and incorporating the features of two-control operation according to my earlier patent is disclosed in the drawings. There are disclosed therein the wings A, B of an aircraft, at the trailing edges of which are respectively pivoted the usual ailerons 2, 4 which may be raised or lowered about the pivot lines C at their leading edges. A high lift flap 6 is positioned between the ailerons 2, 4 and may be raised and lowered about the pivot line C at its leading edge. The tail assembly comprises a horizontal stabilizer 8, elevator 10, vertical fin 12, and rudder 14. The elevator 10 may be raised or lowered about pivot line D at its leading edge, and the rudder 14 may be turned left or right about pivot line E at its forward edge.

In accordance with the invention the various described control surfaces are connected and operable in accordance with the so-called "two-control" system of operation which is described and claimed in my earlier patent. The control system comprises a control column 20, which is rotatable about its vertical axis F by means of a control wheel 22 and gearing 24, and which may be rocked backwardly and forwardly about pivot line G, which is disposed intermediate its length, when the control wheel 22 is moved backwardly or forwardly. A rod 26 extends rearwardly from the lower end of the control column, which is below pivot line G, to a bracket connected to the upper surface of the elevator 10 whereby the elevator is raised or lowered when the control wheel is moved backwardly or forwardly, respectively. A second rod 28 is connected to the control column 20 at the pivot axis G and at a point spaced laterally from the column and extends rearwardly to be connected to one arm of a lever 30, the other arm of which is connected by rod 32 to a bracket extending from one face of rudder 14. The lever 30 is disposed above and is rigidly attached to a second lever 34, to one arm of which a rod 36 is connected which extends laterally outwardly toward the aileron 4. At its outer end the rod 36 is connected to a reversed J-shaped lever 38 intermediate the ends thereof, the shorter end of which is pivotally connected, at pivot axis H, to one corner of a triangular connecting member 40, the forward (or leading edge) corner of which is pivoted about a fixed axis I. The outer end of the longer arm of the J-shaped lever is connected by rod 42 to a bracket extending downwardly from the lower surface of the aileron 4. The aileron 2 is connected to the second arm of the lever 34 by rod 36' and a duplicate arrangement of levers, etc., as clearly shown in the drawings.

It will be seen that if the control wheel 22 is moved fore or aft the control column will rotate about the pivot line G, thus moving the rod 26 backwardly or forwardly and deflecting the elevator 10 downwardly or upwardly to control the longitudinal attitude of the airplane.

It will also be seen that if the control wheel 22 is turned to the left the column 20 will be rotated clock-wise about axis F, thus moving rod 28 rearwardly, rotating the lever 30 clockwise and moving the rod 32 forwardly to deflect the rudder to the left about hinge line E. Rotation of lever 30 will cause the bellcrank 34 to be rotated simultaneously in the same direction. This will cause the rod 36 to be moved inboard and turn the J-shaped lever counter-clockwise about the pivot line H, thus moving rod 42 forward and deflecting aileron 4 downwardly about the hinge line C. The movement of these parts in the described manner is illustrated in Fig. 2. The aileron 2 will be simultaneously deflected upwardly by similar but reverse movement of rod 36' and associated parts in a manner similar to that described.

Means are also provided by the invention for simultaneously lowering the ailerons 2, 4 and, if desired and it is provided, the additional lift-increasing flap 6, in order to provide the high-lift effect which is so desirable at take-off and landing. Such means comprise a flap control lever 50 which is pivotally mounted at its lower end about pivot axis K and is positioned for convenient operation by the pilot. Intermediate its ends the lever 50 has connected to it the forward end of a rod 52, the rear end of which is connected to the free end of a lever 54, the other end of which is connected to a vertical shaft 56 which preferably extends through the pivotal axis L of levers 30, 34 but is not connected in any way to such levers. The shaft 56 also carries a second lever 58, the outer end of which is connected by rod 60 to a bracket carried by the upper surface of additional lift-providing flap 6. A third lever 62 is connected at its center to shaft 56 and the two arms thereof are respectively connected by rods 64, 64' to the rearward (trailing edge) apices of triangular connecting members 40, 40'.

It will be seen that when the flap control lever 50 is moved rearwardly about its pivot the rod 52 will be moved rearwardly, causing levers 54, 58 and 62 to be rotated clockwise about pivot axis L. Such movement of lever 58 will move rod 60 rearwardly, thereby lowering high-lift flap 6. Such movement of bellcrank 62 will cause rod 64 to be moved inboard, rotating triangular member 40 in a clockwise direction about the pivot line I, thus moving the J-shaped lever 38 and rod 42 forwardly to deflect the combined flap-aileron 4 downwardly about the hinge line C. The described movement of lever 62 will be transmitted through rod 64', triangular link member 40', J-shaped lever 38' and rod 42' to deflect the combined flap-aileron 2 downwardly simultaneously with flap 6 and combined flap-aileron 4.

As stated hereinbefore, the combined aileron-flap devices may be operated as ailerons from an initial drooped position, in which they had been operated as high-lift flaps, or from a raised position, and it has been found that the adverse yawing moments produced by operation of these members as ailerons is much greater when such operation begins from the drooped position than it is when the operation begins from a raised position. Means are therefore provided by the invention for causing the rudder deflection, which always accompanies aileron operation in this type of two-control airplane, to be greater when the aileron operation begins from a drooped position than it is when such operation begins from a raised position. One embodiment of such means are disclosed in Figs. 3 and 4, in which are illustrated parts of an aircraft control system such as is disclosed in Fig. 1, the parts not shown in Figs. 3 and 4 being identical with the corresponding parts shown in Fig. 1.

In Figs. 3 and 4 there is disclosed the lever 30' which is connected at one end thereof to control column 20 by rod 28, as in Fig. 1. The other arm of lever 30', which in Fig. 1 is connected directly to the rudder by rod 32, has pivotally attached thereto, intermediate its ends, a lever 70, the outer end of which is connected to the rudder by rod 32'. The inner end of lever 70 is enlarged and has an arcuate, rearwardly-convex slot 72 formed therein within which is slidably received a pin 74 which is carried by one arm of a lever 76, the other arm of which is connected by rod 78 to the flap control lever 50', to which is also connected the rod 52 which connects the lever to lever 54 as disclosed in Fig. 1. The lever 76 is supported on a fixed pivot disposed forwardly of the slotted part of lever 70.

The operation of the control system of Figs. 3 and 4 will now be described. If the combined-aileron flap devices are in the raised position, the flap control lever 50' is obviously in the forward, or inoperative, position in which the lever 76 is in position A, as shown in Fig. 4, in which the pin 74 is positioned in slot 72 at a maximum distance from the pivotal connection of lever 70 to lever 30'. If now the control column is rotated to cause aileron operation the lever 30' will be rotated about axis L in the usual manner and the motion of its connection to lever 70 causes that lever to pivot about the pin 74, which is now at a maximum distance from such connection, whereby its movement with respect to lever 30 will be a minimum. The amount of movement of rudder-connected rod 32' will therefore be a minimum and will closely approximate the amount of movement of the lever 30'.

If all controls are in neutral position and the flap-control lever is pulled to the rear to lower the flaps through rod 52, the lever 76 will be rotated clockwise about its pivot to position B in Fig. 4, thereby moving the pin 74 through the slot 72 in the direction of the connection between lever 30' and lever 70. If the control column is now rotated to operate the ailerons it will be seen that the movement transmitted to lever 70 by lever 30' will be increased over that normally produced, because of the closer position of the pin 74 to the pivotal connection between lever 30' and lever 70. The lever 70 will therefore be moved to position B' in Fig. 4, thus causing its pivotal connection to rod 32' to move through a greater distance than was the case when lever 76 was in position A, and effecting an increased rudder deflection.

These various described effects are illustrated in Fig. 4, from which it will be seen that the amount of movement of rudder-connected rod 32' is greatest when the flap-control lever 50' and rod 52 are in their rearward positions.

While I have described and illustrated certain embodiments of my invention it will be apparent to those skilled in the art that other embodiments, as well as modifications of those disclosed, may be made without departing in any way from the spirit or scope of the invention, for the limits of which reference must be had to the appended claims.

What is claimed is:

1. An aircraft having a wing, hinged ailerons forming laterally spaced parts of the trailing edge portion of the wing, means for moving said ailerons about their hinges to similar drooping positions to provide a high-lift effect, means for differentially moving said ailerons about their hinges from their normal undeflected positions within the wing camber or from similar drooping positions to provide lateral control of the aircraft, a rudder laterally swingable about a vertical hinge, means connecting the rudder to the means for differentially moving the ailerons and operable upon differential movement of said ailerons from either their normal undeflected positions or from their similar drooped positions to move said rudder about its axis in such a direction as to cause it to oppose adverse yawing moments due to differential movement of the ailerons, and means operated by the means for moving the ailerons to similar drooped positions and operable upon such movement of the ailerons to increase the amount of rudder movement due to differential operation of the ailerons from such drooped positions above the amount of rudder movement due to differential operation of the ailerons from their normal undeflected positions.

2. An aircraft having a wing, hinged ailerons forming laterally spaced parts of the trailing edge portion of the wing, means for moving said ailerons about their hinges to similar drooping positions to provide a high-lift effect, means for differentially moving said ailerons about their hinges from their normal undeflected positions within the wing camber or from similar drooping positions to provide lateral control of the aircraft, a rudder laterally swingable about a vertical hinge, means connecting the rudder to the means for differentially moving the ailerons and operable upon differential movement of said ailerons from either their normal undeflected positions or from their similar drooped positions to move said rudder about its axis in such a direction as to cause it to oppose adverse yawing moments due to differential movement of the ailerons, and means operated by the means for moving the ailerons to similar drooped positions and operable upon such movement of the ailerons to so adjust said connecting means as to increase the amount of rudder movement due to differential operation of the ailerons from such drooped positions above the amount of rudder movement due to differential operation of the ailerons from their normal undeflected positions.

3. An aircraft according to claim 2, in which the means connecting the rudder to the means for differentially moving the ailerons comprises two pivotally connected levers one of which is connected to the means for differentially moving the ailerons and the other of which is connected to the rudder, and the means for adjusting the connecting means comprises means operated by the means for moving the ailerons to similar drooped positions for changing the fulcrum point of the lever which is connected to the rudder.

FRED E. WEICK.

REFERENCES CITED

The following references are of record in the file of this patent:

UNITED STATES PATENTS

| Number | Name | Date |
|---|---|---|
| 1,627,004 | Albessard | May 3, 1927 |
| 2,082,172 | Mignet | June 1, 1937 |
| 2,172,813 | Waterman | Sept. 12, 1939 |
| 2,228,311 | Gwinn | Jan. 14, 1941 |